INVENTOR
GUNNAR HURTIG III
BY Samuel Lindenberg
Abraham Wasserman
ATTORNEYS

Jan. 16, 1968 G. HURTIG III 3,364,435

ACTIVE FILTER NETWORK

Filed Jan. 11, 1965 2 Sheets-Sheet 2

INVENTOR
GUNNAR HURTIG III
BY Samuel Lindenberg
Abraham Wasserman
ATTORNEYS

United States Patent Office 3,364,435
Patented Jan. 16, 1968

3,364,435
ACTIVE FILTER NETWORK
Gunnar Hurtig III, Woodland Hills, Calif., assignor, by mesne assignments, to Fairchild Camera and Instrument Corporation, Syosset, N.Y., a corporation of Delaware
Filed Jan. 11, 1965, Ser. No. 424,788
19 Claims. (Cl. 330—23)

ABSTRACT OF THE DISCLOSURE

An active filter having two passive networks and an active circuit connected in tandem between them. The active circuit is uniquely designed to include active and passive elements which are selected so that the input and output immittances of the active circuit are not equal to zero. The input and output immittances of the active circuit are absorbable in the resistive element or elements included in the two passive networks.

This invention relates to transmission networks, and, more particularly, to improvements in active transmission networks.

The designer of transmission networks, such as filters, often encounters transmission requirements which cannot be met by employing only passive elements or networks. For example, in the design of conventional wave filters which are to operate at very low frequencies, very large and expensive inductors need be incorporated. Thus, if one of the design criteria is that the network be very small, means must be designed to replace the relatively bulky inductors. Furthermore, the inductors are generally quite expensive. Therefore, replacing them with a less expensive network greatly reduces the overall cost of the desired filter.

In recent years, extensive research has been devoted to develop active filters which, though exhibiting transmission characteristics as if inductors are included therein, only comprise passive elements such as resistors (R) and capacitors (C), and an active network or circuit. The combination of the active circuit and the passive elements acts as an active transducer or filter which may possess any desired transmission characteristic. One example of such an active transducer is disclosed in U.S. Patent No. 2,788,496, issued Apr. 9, 1957, to John G Linvill. Therein, an active circuit extensively described in the literature as a Negative Impedance Converter is incorporated with R-C passive elements to comprise an active transducer or filter.

As defined in the prior art, a negative impedance converter is a unique circuit, in that the input impedance thereof is a negative function of its output impedance. To exhibit such characteristic, components of the converter must be carefully selected to possess the proper values. Furthermore, the converter is very temperature sensitive, and is not stable with variations in the D.C. voltages supplied thereto. Thus, even though the use of a negative impedance converter in active filters is experimentally feasible, some of its disadvantages are responsible for its limited practical applications.

Accordingly, it is an object of the present invention to provide an active circuit which is adapted to be combined with passive elements to possess desired transmission characteristic, but which is not limited by prior art disadvantages.

Another object of the present invention is to provide an active circuit having unique characteristics useful in stabilizing its operation over a desired temperature range so that when combined with resistive and capacitive elements, the combination is temperature stable.

Still another object of the present invention is the provision of an active filter in which variations in the supply voltages to the active circuit incorporated therein are compensatable, thereby increasing the overall stability of the filter and the transmission characteristics thereof.

A further object of the invention is to provide a simple and inexpensive active circuit which can be easily mass produced. The circuit is adapted to be combined with R-C elements to possess desired transmission characteristic over a relatively wide temperature range.

These and other objects of the invention are achieved by providing a transistorized active circuit which has particular input and output immittance characteristics. In a preferred embodiment, the input impedance which can be represented by the hybrid parameter $h_{11}$ is selected to be negative. This enables the circuit to be combined with temperature sensitive elements having negative resistive temperature coefficients so that the overall input impedance of the circuit is stabilized over an appreciable temperature range. The output admittance of the active circuit, represented by the hybrid parameter $h_{22}$, is selected to have a value other than zero. This greatly simplifies the problem of coupling passive elements to the output of the circuit of the present invention so that the entire combination may act as an active filter with selected transmission characteristics.

As will hereinafter be explained in detail, the specific values of the components incorporated in the active circuit of the present invention are chosen so that the particular input and output immittances of the circuit have values which aid in stabilizing the performance of the active filter despite variations in the supply voltages associated with the active circuit.

The active circuit of the invention can be practically constructed to have the required necessary characteristics, without the need to carefully select components of precise values to be incorporated therein, as is the case when building a negative impedance converter. Furthermore, the characteristics of the active circuit of the invention enable the implementation of a design technique by which the circuit is stabilized over an appreciable temperature range and despite some variations in supply voltages. Thus, when the active circuit is combined with resistive and capacitive passive elements, the combination performs as a stable active filter which may be designed to have any physically realizable transmission or transfer function characteristic.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
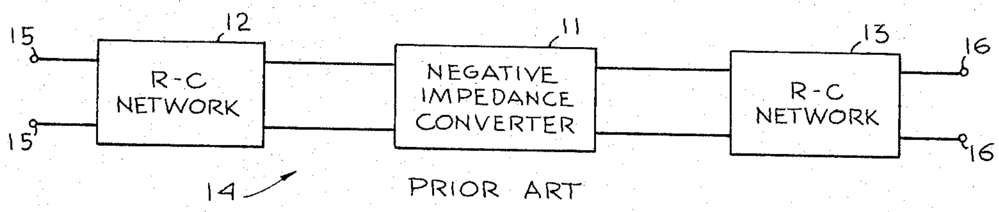
FIGURE 1 is a block diagram useful in describing the prior art.

For a better understanding of the present invention and the advantages thereof over prior art networks, a brief reference will first be made to prior art active filters employing negative impedance converters which are quite known by those familiar with the art. FIGURE 1, to which reference is made herein, is a simplified block diagram of a prior art active filter in which a negative impedance converter 11 is shown interposed between R-C passive networks 12 and 13. Since one of the main advantages of active filters is their small size, it is assumed that the converter 11 is transistorized, as will be the case whenever reference is made to a negative impedance converter. The entire combination comprises a four terminal filter network 14 having input terminals 15 and output terminals 16. As previously pointed out, even though such an active filter can be constructed to operate under limited conditions, the very strict characteristics of the negative impedance converter 11 greatly limit the practical implementation of the active filter and its usefulness if variations in voltages and temperature cannot be avoided.

As is known by those familiar with the art, an ideal transistorized negative impedance converter can be defined as a function of its hybrid ($h$) parameters. When so defined, the converter has an input impedance $h_{11}$ and output admittance $h_{22}$ which must be zero in order for the converter to possess negative impedance properties. To possess parameters $h_{11}$ and $h_{22}$ which equal zero, the components incorporated in the negative converter 11 must be carefully chosen to have very precise values. But even when built, the usefulness of the converter is very sensitive to temperature changes, and supply voltage variations.

The reason for such sensitivity can better be understood from a consideration of the relationship between the input impedance $h_{11}$ and the current magnification factor of transistors generally designated as $\beta$. The parameter $h_{11}$ is generally a function of $1/\beta$. As temperature increases, $\beta$ always increases and therefore $h_{11}$ decreases. However, since in a negative impedance converter $h_{11}$ must be at all times equal to zero, it is apparent that any change in temperature changes the impedance $h_{11}$ to be other than zero. Consequently, the converter no longer operates as a true negative impedance converter and, therefore, the characteristics of the entire active filter in which the negative impedance converter is incorporated vary with temperature.

Figure 2:
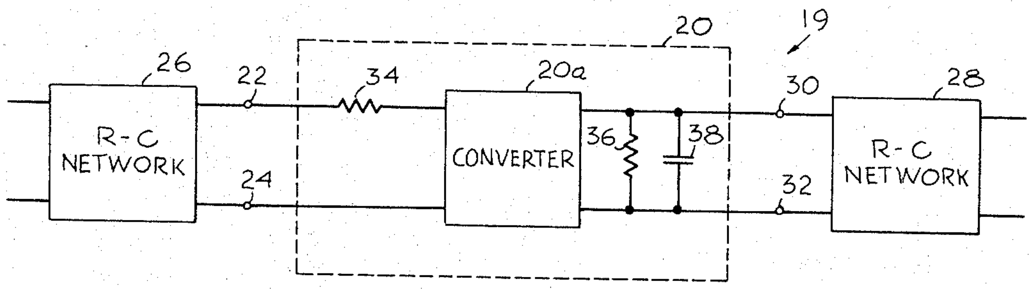
FIGURE 2 is a block diagram of an active filter incorporating the active circuit of the present invention.

These and other disadvantages of prior art active filters incorporating an active circuit, such as a negative impedance converter, are overcome or greatly minimized by the novel active circuit of the present invention. Referring to FIGURE 2, there is shown an active filter 19, including an active circuit 20 connected at its input terminals 22 and 24 to the output terminals of a passive R-C network 26. A second passive R-C network 28 is connected to the output terminals 30 and 32 of active circuit 20. The active circuit 20 is designed so that its input impedance $h_{11}$ and its output admittance $h_{22}$ are not zero, as is the case in negative impedance converter. Rather, $h_{11}$ and $h_{22}$ are chosen to have absolute values which are other than zero. Thus, the circuit 20 may be thought of as comprising a negative impedance converter 20*a* having parasitic immittances $h_{11}$ and $h_{22}$. In FIGURE 2, the input impedance $h_{11}$ is diagrammed by resistor 34 connected between terminal 22 and circuit 20*a*. The output admittance $h_{22}$ is represented by a resistor 36 connected across the output terminals of circuit 20*a*, whereas a capacitor 38 represents the shunt capacitance thereacross.

From a comparison of FIGURES 1 and 2, it is seen that except for the resistor 34 representing the input impedance of circuit 20, and resistor 36 representing the output admittance thereof, the arrangements in the two figures are similar. Thus, it is seen that if these two immittances can be absorbed in the passive networks 26 and 28, as taught hereinafter in detail, the methods of transfer function synthesis used in the prior art to provide an active filter by combining a negative impedance converter with two passive R-C networks (FIGURE 1) can be applied to the arrangement shown in FIGURE 2.

In order for the two immittances to be absorbed in the design of the passive networks 26 and 28, some specific requirements must be placed on the design of these passive networks. From FIGURE 2 it is seen that for resistor 34 to be absorbed in R-C network 26, the network must possess a resistive branch in its output section so that resistor 34 may be combined therewith. Similarly, R-C network 28 must be of the type having an input shunt resistance and capacitance which may be combined with resistor 36 and capacitor 38 respectively.

The output and input impedances of networks 26 and 28 may best be defined by the following equations in which $$Z_{22}^{26}$$

represents the output impedance $Z_{22}$ of network 26

$$Z_{11}^{28}$$

represents the input impedance $Z_{11}$ of network 28, and the symbol in parenthesis represents frequency. Thus, $$0 < Z_{22}^{26}(\infty) < \infty \qquad (1)$$

$$Z_{11}^{28}(\infty) = 0 \qquad (2)$$

$$0 < Z_{11}^{28}(0) < \infty \qquad (3)$$

Equation 1 represents the requirement that even at a frequency of infinity, the output impedance $Z_{22}$ of network 26 is positive, thus indicating a resistance. Equation 2 represents the requirement that the input impedance of network 28 is equal to zero at infinity, thus indicating the presence of a shunt capacitance. And, Equation 3 represents the requirement that at zero frequency, the input impedance $Z_{11}$ of network 28 is other than zero but less than infinity, thus indicating the resistive component of the input impedance $Z_{11}$.

Figure 3:
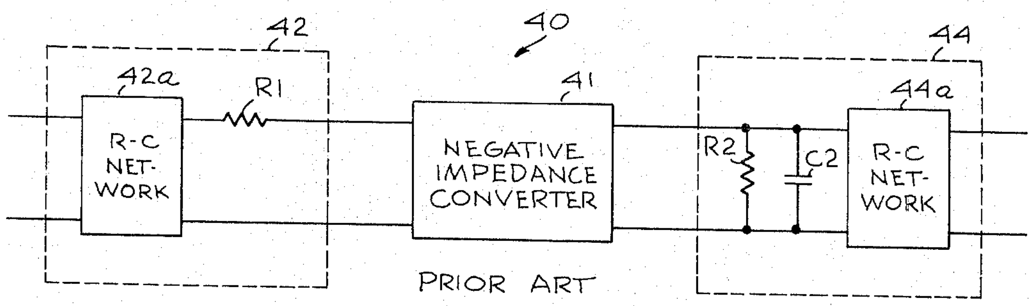
FIGURE 3 is another block diagram of a prior art arrangement.
Figure 4:
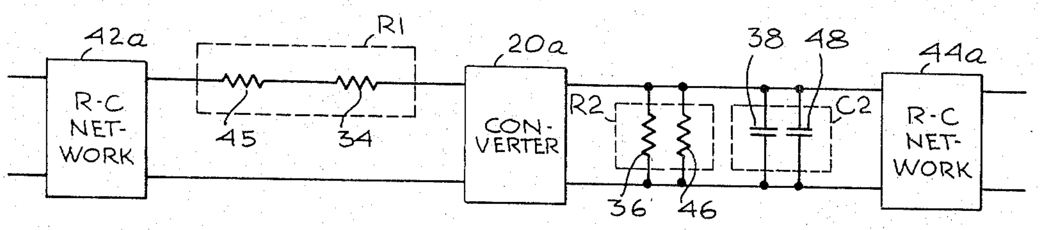
FIGURE 4 is another block diagram of an active filter constructed in accordance with the teachings of the present invention.

Reference is now made to FIGURES 3 and 4 which show block diagrams useful in explaining the manner in which the non-zero immitances $h_{11}$ and $h_{22}$ of the circuit of the present invention are absorbed in related R-C passive networks. Let it be assumed that an active filter 40 which is to possess a desired transmission characteristic is realizable by incorporating a conventional negative impedance converter 41 with two passive R-C networks 42 and 44. As seen from FIGURE 3, network 42 comprises a network 42*a* in series with an output impedance resistor R1. Namely, network 42 satisfies the relationship represented by Equation 1. Similarly, network 44 comprises a network 44*a* having a resistor R2 and capacitor C2 connected accross the input thereof so that the relationships expressed by Equations 2 and 3 respectively are satisfied.

The arrangement shown in FIGURE 3 is similar to that shown in FIGURE 1 except that the two passive R-C networks coupled to the negative impedance converter 41 have specific characteristics across the terminals coupling them to the converter 40. However, according to the teachings of the present invention, the specific R-C networks 42 and 44 need not be combined with a negative impedance converter which is limited by known disadvantages hereinbefore described. Rather, the networks 42 and 44 may be combined with the circuit of the present invention such as circuit 20 (FIGURE 2). The only design modification that need be made is that instead of combining the resistors R1, R2 and C2 to the active circuit 20*a*, these components are scaled down to include the parasitic immittances of the circuit to the invention. Namely, after R1 is determined, its value is scaled down to absorb resistor 34, and R2 and C2 are scaled down to absorb resistor 36 and capacitor 38 respectively.

As seen from FIGURE 4, network 42*a* is connected to the active circuit 20*a* through a resistor 44 which is in series with the resistor 34, the latter resistor representing the input impedance $h_{11}$ of the circuit of the present invention. Resistor 44 is chosen so that its resistance, plus that of resistor 34 equals the resistance of R1. This is indicated by the dashed line designated R1 which surrounds the two resistors. Similarly, R2 (FIGURE 3) is changed to resistor 46 so that the parallel combination of resistors 46 and 36, the latter representing the output admittance of the circuit of the present invention, equals R2. Also, capacitor 48 is chosen to have a value which, when combined with capacitor 38 representing the output shunt capacitance of circuit 20, equals C2. The values of R2 and C2 are diagrammatically represented in FIGURE 4 by dashed lines surrounding the respective combinations of resistors 36 and 46, and capacitors 38 and 48.

From the foregoing, it is thus seen that the prior art active filter arrangement such as is shown in FIGURE 3 in which a negative impedance converter is used, can be modified according to the teachings disclosed herein to incorporate the active circuit of the present invention. The fact that the active circuit of the present invention has an input impedance $h_{11}$ which is not zero is not at all limiting since, such an impedance is absorbed in the design of the R-C network preceding the active circuit. Similarly, the fact that the circuit has a non-zero output admittance $h_{22}$ is not limiting since such admittance is absorbable in the R-C network succeeding the circuit.

The methods of transfer function synthesis necessary in designing an active filter which includes a negative impedance converter in conjunction with R-C passive networks are amply described in the literature, and are well known by those familiar with the art. For example, one method of transfer function synthesis is described in U.S. Patent 2,788,496 hereinbefore referred to.

Similar methods are described in the paper by Takesi Yanagisawa, entitled "R-C Active Networks Using Current Inversion Type Negative Impedance Converters," in the IRE Transactions on Circuit Theory, September 1957, pp. 140–144. In addition, the methods of employing negative impedance converters in active filters in summarized in a thesis by the present applicant, the description of which is herein incorporated, entitled, "Transfer-Function Realization Using Nonideal Negative Impedance Converters," presented to the faculty of the Graduate School of Cornell University for the Degree of Master of Science, June 1964.

From the foregoing, it is thus seen that when employing R-C networks which satisfy the requirements expressed by Equations 1 through 3, the transfer function synthesis developed for negative impedance converter type active filters can be expanded to include the circuit of the present invention, which differs from the negative impedance converter in having input and output immittances ($h_{11}$ and $h_{22}$) which are not zero. Thus, the need for a negative impedance converter which as hereinbefore explained, can only be designed by carefully matching components, is eliminated. Also, since a negative impedance converter is very temperature sensitive due to changes in its input impedance $h_{11}$ from the desired value of zero as a function of temperature, it is appreciated that by replacing the negative impedance converter with a temperature compensatable circuit of the present invention, the overall temperature stability of the active filter is increased.

For a better understanding of the advantages of the active circuit of the invention, in increasing the temperature stability of an active filter in which it may be incorporated, it is recalled that in the active circuit of the invention, $h_{11}$ is always made to be equal to a value other than zero. In a preferred embodiment, components are selected so that $h_{11}$ is made to be negative. As previously explained, $h_{11}$ decreases as $\beta^s$ of the transistors of the active circuit increase with temperature. Therefore, a positive resistance element having a negative temperature resistance coefficient, such as a thermistor may be combined in the input branch with the input impedance $h_{11}$. Consequently, as the negative resistance $h_{11}$ decreases with temperature, so does the resistance of the thermistor, resulting in a zero change in the sum of the resistances of the two elements over a selected temperature range. For example, assuming $h_{11}$ is equal to $-400$ ohms so that when combined with a thermistor of $+300$ ohms, the net input impedance is $-100$ ohms. Then, with temperature $h_{11}$ decreases, say to $-250$ ohms. But, since with temperature the thermistor also decreases, say to 150 ohms, the net input impedance of $-100$ ohms remains unchanged.

The above-described capability of temperature compensation is not possible with a negative impedance converter, since in the converter, $h_{11}$ must always be zero. Thus, it is not possible to insert a thermistor therein, since such a component will unbalance the input impedance from a value of zero.

The advantages of the active circuit of the present invention in which $h_{11}$ and $h_{22}$ are not equal to zero as is the case in a negative impedance converter, may further by demonstrated in connection with the sensitivity of a transfer function T($s$) of an active filter with respect to a variable such as voltage supplied to the active circuit, included in the active filter. As described in various prior publications related to the art of active network or filter design, it can be shown that the change of the transfer function T($s$) of the filter with respect to the change in a parameter $p$ which may represent voltage is a function of the changes of $h_{11}$ and $h_{22}$ with respect to the change in voltage as well as the change of a term K with respect to the change in voltage. K is defined as the product of the reverse voltage amplification factor ($h_{12}$) of the active circuit and $h_{21}$ which is the forward current gain thereof. Namely, $K=h_{12}h_{21}$. Thus, $$\frac{\partial T(s)}{\partial p}=f\left(\frac{\partial h_{11}}{\partial p},\frac{\partial h_{22}}{\partial p},\frac{\partial K}{\partial p}\right) \qquad (4)$$

From Equation 4, it is seen that in order to minimize the effect of change of voltage on the transfer function T($s$), it is necessary to control the derivatives shown on the right-hand side of the equation, so that $\partial T(s)/\partial p$ would approach zero. However, in a negative impedance converter where $h_{11}$ and $h_{22}$ are zero, $\partial T(s)/\partial p$ is only a function of $\partial K/\partial p$. Since the latter is never zero, it is apparent that in a negative impedance converter, $\partial T(s)/\partial p$ can never be made to approach zero. Consequently, due to the specific characteristics of the negative impedance converter, the transfer function of the active filter is always affected by changes in voltage supplied to the converter. However, in the active circuit of the present invention, $h_{11}$ and $h_{12}$ are not zero. Thus, $\partial T(s)/\partial p$ is a function of all three variables of the right-hand side of Equation 4. Consequently, $h_{11}$ and $h_{22}$ may be controlled so that the change in transfer function with a change in voltage may be minimized. Namely, $\partial T(s)/\partial p$ may be made to approach zero.

From the foregoing, it is thus seen that the active circuit with a negative input impedance $h_{11}$ is advantageous in stabilizing the input impedance despite changes in temperature. Furthermore, the nonzero input and output immittances $h_{11}$ and $h_{22}$ aid in reducing the affect of changes in voltages supplied to the active circuit on the transfer function T($s$) of the active filter.

Figure 5:
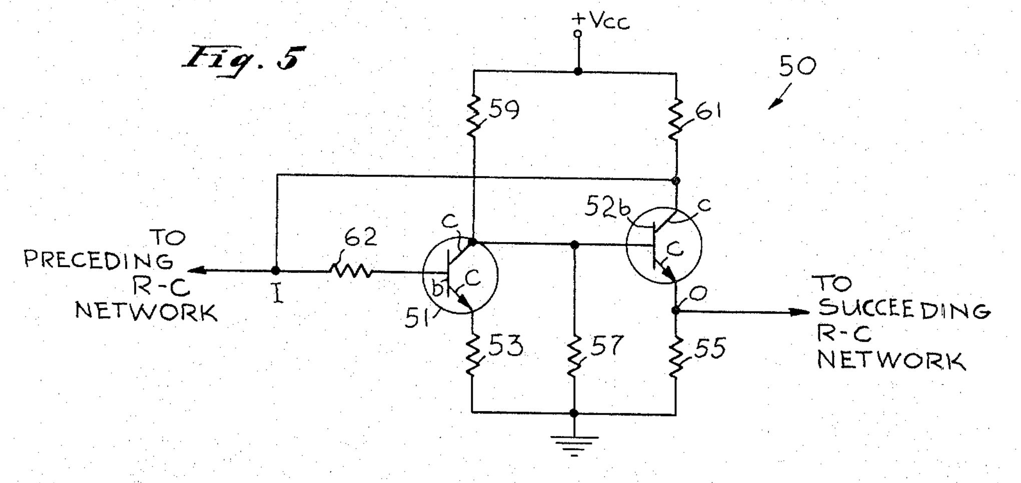
FIGURES 5 and 6 are schematic diagrams of the novel active circuit of the invention.

Reference is now made to FIGURE 5 which is a schematic diagram of an active transistorized circuit 50 which is particularly adapted to be combined with R-C passive networks, such as networks 42 and 44 perform as an active filter. The active circuit 50 comprises transistors 51 and 52. Transistor 51 has a base 51*b*, collector 51*c* and an emitter 51*e*. Transistor 52 similarly has a base 52*b*, collector 52*c* and emitter 52*c*. Emitters 51*e* and 52*c* are connected through respective resistors 53 and 55 to a point of reference potential such as ground. Collector 51*c* is connected to the base 52*b*, and in addition is connected to ground potential through a resistor 57. Also, collectors 51*c* and 52*c* are connected through respective resistors 59 and 61 to a source of reference potential or voltage designated $+V_{cc}$. Collector 52*c* is connected to the base 51*b* through a resistor 62. The junction point between the collector 52*c* and resistor 62 serving as an input terminal is designated by letter I. Similarly, the junction point between the emitter 52*c* and resistor 55 serves as an output terminal and is designated by letter O. Ground potential serves as a common input-output terminal.

By employing any one of known circuit analysis methods, it can be shown, as demonstrated on Pages 50 through 54 of the above-referred to thesis, that the circuit of FIGURE 5 possesses the following characteristics expressed in terms of $y$ and $h$ parameters:

$$y_{11}=\frac{1}{R_{61}}+\left(\frac{\frac{1}{R_{61}}}{1+\beta_1+\frac{R_{62}+h_{11}^{51}}{R_{53}}}\right)\left(1-\frac{\beta_1\beta_2}{1+\frac{h_{11}^{52}}{Rx}}\right) \qquad (5)$$

$$y_{12}=-\frac{\frac{\beta_2}{Rx}}{1+\frac{h_{11}^{52}}{Rx}} \qquad (6)$$

$$y_{21}=\frac{\frac{\beta_1(1+\beta_2)}{R_{53}}}{\left(1+\frac{h_{11}^{52}}{Rx}\right)\left(1+\beta_1+\frac{R_{62}+h_{11}^{51}}{R_{53}}\right)} \qquad (7)$$

$$y_{22}=\frac{1}{R_{55}}+\frac{\frac{1+\beta_2}{Rx}}{1+\frac{h_{11}^{52}}{Rx}} \qquad (8)$$

In the above equations, $\beta_1$ and $\beta_2$ represent the respective current magnification factors of transistors 51 and 52, $$h_{11}^{51}$$

is the input impedance into transistor 51 and $$h_{11}^{52}$$

is the input impedance into transistor 52. R$x$ represents the equivalent resistance of resistors 57 and 59 in parallel.

By properly selecting the transistors and associated resistors, it is possible to control the overall parameters of the circuit 50 so that its input impedance $h_{11}$ is negative and its output impedance $h_{22}$ is other than zero. For example, let it be assumed that $\beta_1=\beta_2=50$ $$h_{11}^{51}=h_{11}^{52}=5{,}500 \text{ ohms}$$

resistors 53 and 55, 57 and 59 equal 5,100 ohms, 10,000 ohms, 27,000 ohms and 14,700 ohms respectively. Resistors 61 and 62 equal 10,000 ohms and 680,000 ohms respectively. The Equations 5 through 8 may be reduced as follows:

$$y_{11}=-15.86\times10^{-4} \qquad (5')$$
$$y_{12}=-33.50\times10^{-4} \qquad (6')$$
$$y_{21}=17.18\times10^{-4} \qquad (7')$$
$$y_{22}=35.2\times10^{-4} \qquad (8')$$

Since the $y$ parameters of a circuit are related to the $h$ parameters, the values of the latter can be derived as follows:

$$h_{11}=1/y_{11}=-630.5 \text{ ohms} \qquad (9)$$

$$h_{12}=\frac{-y_{21}}{y_{11}}=-2.11 \qquad (10)$$

$$h_{21}=y_{21}/y_{11}=-1.08 \qquad (11)$$

$$h_{22}=\frac{y_{22}y_{21}-y_{11}y_{12}}{y_{11}}=-1.04\times10^{-4} \text{ mhos} \qquad (12)$$

In addition, the term K previously defined as $h_{12}h_{21}$ equals +2.28.

From the foregoing, it is seen that the active circuit 50 (FIGURE 5) possesses the desired input and output immittances. Namely $h_{11}$ is negative and $h_{22}$ is other than zero. In addition, $h_{12}$ and $h_{21}$ are negative, and the product of $h_{11}$ and $h_{21}$ is greater than the product of $h_{11}$ and $h_{22}$.

Since, in the active circuit of the present invention, a basic requirement is that $h_{11}$ and $h_{22}$ not be equal to zero, it is seen from Equations 5 through 8 and 9 through 12 that the effect of temperature variations, namely the effect of changes in $\beta^s$ on the $y$ and $h$ parameters, can be minimized by appropriate changes in the resistors of the circuit. For example, since $y_{11}$ (Equation 5) decreases as $\beta_1$ and $\beta_2$ increase with temperature, it is seen that by reducing the resistance of resistors 53 and the parallel combination of resistors 57 and 59, the effect of the change in the values of $\beta_1$ and $\beta_2$ on $y_{11}$ can be minimized.

Figure 6:
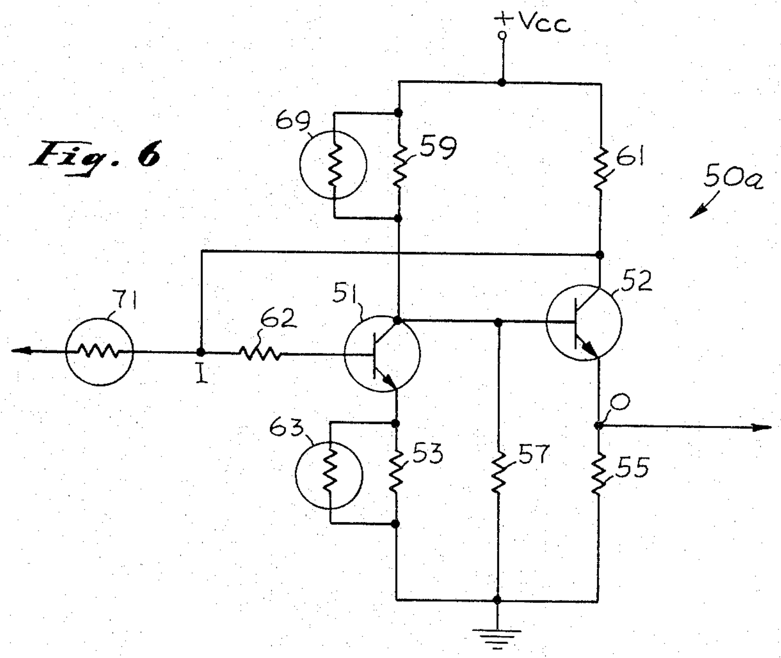

Reference is now made to FIGURE 6 which is another schematic diagram of the active circuit of the present invention. As seen therein, the circuit 50*a* is similar to circuit 50 shown in FIGURE 5, except that circuit 50*a* includes temperature compensating resistive elements, such as thermistors 63 and 69. The thermistors are connected in parallel across resistors 53 and 59 respectively. Although thermistors are shown in shunt with resistors 53 and 59, it is appreciated that a resistor may be connected in series with each shunting thermistor so that the change in resistance of either resistor 53 or 59 due to temperature may more accurately be controlled.

In addition to thermistors 63 and 69, circuit 50*a* also includes a thermistor 71 which is connected in series between the junction point I and the R-C passive network which may precede circuit 50*a* in an active filter. The thermistor 71 greatly increases the stability of the input impedance of circuit 50*a* despite temperature variation thereby greatly reducing the effect of temperature on the transfer function of the filter. For example, let it be assumed that in the absence of the thermistor, $h_{11}$ of the specific circuit shown is −630.5 ohms. Then, by inserting a positive resistance element, such as thermistor 71 which, for explanatory purposes, is assumed to have at a given temperature, a positive resistance of 500 ohms, the net input impedance equals −130.5 ohms. With changes in temperature however (assuming a rise in temperature), $h_{11}$ decreases but so does the resistance of the thermistor 71 so that the net input impedance remains substantially constant even though the temperature changes.

In addition to the advantages of the active circuit of the present invention hereinbefore described, it is seen from FIGURES 5 and 6 that the circuit only includes transistors and resistive elements without any capacitors. The absence of capacitors broadens the range of operation of the active circuit to include operations with alternating current (AC) as well as direct current (DC). Such operation cannot be accomplished with active circuits such as negative impedance converters which generally include capacitors, thus limiting their operation to alternating current only.

Figure 7:
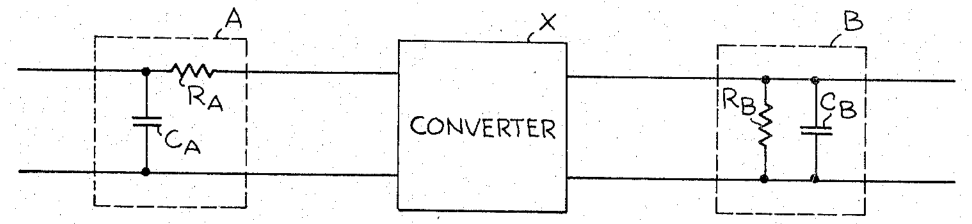
FIGURE 7 is another block diagram useful in explaining the teachings of the invention in connection with a specific active filter.

The method of transfer function synthesis in accordance with the teachings of the present invention may further be explained, when considering the use of the active circuit hereinbefore described, together with R-C passive elements in an active filter, which for explanatory purposes is assumed to have a second-order linear-phase function. Such a filter may be thought of as a low pass filter. The phase or transfer function may be approximated by the expression $$T(s)=\frac{H}{s^2+3s+3}=\frac{N(s)}{D(s)} \qquad (13)$$

where N and D are two polynomials in $s$. Let it be assumed that the low pass filter is to comprise the circuit of the present invention and two associated R-C passive networks as shown in FIGURE 7 to which reference is made herein. The passive networks are designated by letters A and B and the circuit by letter X. The transfer function may be expressed in terms of the transfer impedances of networks A and B and the K ($h_{12}h_{21}$) factor of the active circuit X. Namely, $$T(s)=\frac{Z_{21}^{A}Z_{21}^{B}}{Z_{22}^{A}-K_{Z_{11}^{B}}} \quad (14)$$

In Equation 14, $$Z_{21}^{A}$$

is the transfer impedance of network A, $$Z_{21}^{B}$$

is the transfer impedance of the network B, and $$Z_{22}^{A} \text{ and } Z_{11}^{B}$$

are the driving point impedances of networks A and B at the input and output terminals of circuit X.

Since, as hereinbefore explained, it is necessary for the circuit of the present invention, when incorporated in an active filter, to be coupled to passive R-C networks at both its output and input terminals, K must be a positive value. Thus, the terms $$Z_{22}^{A}$$

in the denominator representing all the positive terms in the denominator of the transfer function may represent the characteristics of network A. Similarly, the negative term $$K_{Z_{11}^{B}}$$

represents the characteristics of network B. For K to always be positive, $h_{12}$ and $h_{21}$ of circuit X must both have the same sign. This is satisfied in the foregoing example wherein $h_{12}$ and $h_{21}$ are both negative as seen from Equations 10 and 11.

The expression D($s$) equaling $s^2+3s+3$ may be expressed in the form $(s+\sqrt{3})^2-s(2\sqrt{3}-3)$ and then divided by a polynomial Q($s$). The polynomial Q($s$) is chosen to have zeroes which are restricted to the negative real axis of the complex frequency plane, thus insuring that networks A and B would comprise of only R-C passive components. Also, the degree of Q($s$) is made equal to the degree of the polynomial D($s$) to insure series resistors at the output of network A. The shunt R and C at the input of network B are guaranteed.

Thus Q(s) may be chosen to equal $s(2\sqrt{3}-3)(s+\sqrt{3})$ which satisfies the above requirements.

When both numerator and denominator of the transfer function T($s$) are divided by Q($s$), it can be shown that $$\frac{D(s)}{Q(s)}=\frac{1}{2\sqrt{3}-3}+\frac{1}{\frac{s(2\sqrt{3}-3)}{\sqrt{3}}}-\frac{1}{s+\sqrt{3}} \quad (15)$$

The first two terms on the right side of Equation 15 represent $$Z_{22}^{A}$$

the first of the two terms indicating a resistor and the second term a capacitor. The third term in Equation 15 represents the term $$K_{Z_{11}^{B}}$$

(see Equation 14). Thus, $$Z_{11}^{B}=\frac{1}{K}\frac{1}{s+\sqrt{3}} \quad (16)$$

Assuming that the specific active circuit hereinbefore described is used (Equations 9–12) K equals 2.28. Thus from Equation 16, it can be shown that the transfer impedance $$Z_{11}^{B}$$

comprises a parallel R-C combination where the capacitor equals 2.28 units and the resistor equals $$\frac{1}{2.28\sqrt{3}}$$

A similar analysis of the numerator of the transfer function T($s$) when divided by Q($s$) would yield the characteristics of $$Z_{21}^{A} \text{ and } Z_{21}^{B}$$

$$Z_{21}^{A}Z_{21}^{B}=\frac{N(s)}{Q(s)}=\frac{H}{s(2\sqrt{3}-3)(s+\sqrt{3})} \quad (17)$$

Equating H to be equal to one, and noting the poles of the expressions in the denominator of Equation 15, it is seen that $$Z_{21}^{A}$$

is equal to $$\frac{1}{s(2\sqrt{3}-3}$$

and $$Z_{21}^{B}$$

is equal to $$\frac{1}{s+\sqrt{3}}$$

From the foregoing, it is thus seen that network A comprises a capacitor $C_A$ across the input terminals of the active filter, with a resistor $R_A$ in series with the input to the active circuit X. Network B comprises a parallel combination of a resistor $R_B$ and capacitor $C_B$ connected across the output terminals of the active circuit X, which also act as the output terminals of the active filter. The normalized values of $R_A$ and $R_B$, $C_A$ and $C_B$ are as follows:

$$R_A=\frac{1}{2\sqrt{3}-3}\quad C_A=\frac{2\sqrt{3}-3}{\sqrt{3}}$$

$$R_B=\frac{1}{2.28\sqrt{3}}\quad C_B=2.28 \quad (18)$$

Let it be assumed that the low pass active filter is to have a cutoff frequency of $10^3$ cycles. Then by applying a resistive scaling factor of $10^3$, the values of the four passive components become:

$$R_A=2162 \text{ ohms}\quad C_A=.0427 \text{ mfd.}$$

$$R_B=253 \text{ ohms}\quad C_B=.363 \text{ mfd.} \quad (19)$$

In light of the foregoing description of the active circuit of the present invention and in particular FIGURE 4, it should be recalled that the parasitic immittances $h_{11}$ and $h_{22}$ of the active circuit of the present invention need be absorbed in the two passive networks A and B. Namely, $h_{11}$ is absorbed in $R_A$, $h_{22}$ in $R_B$ and the shunt capacitance of circuit X in $C_B$. Recalling that $h_{11}$ equal −630.5 ohms, $h_{22}$ equals $-1.04\times10^{-4}$ mhos, and assuming a shunt capacitance of .001 microfarads, the values of $R_A$, $R_B$ and $C_B$ become 2792.5 ohms, 246.5 ohms, and .362 mfd. respectively.

It is thus seen that the active circuit of the present invention, having discrete characteristics, can be combined with passive R-C components to perform as an active filter having selected transfer function characteristics. In the foregoing example, a low pass filter has been described. However, it is appreciated that other type filters with selected transfer function characteristics may be produced.

The basic characteristics of the active circuit are its non-zero input impedance $h_{11}$ and output admittance $h_{22}$. Also $h_{12}$ and $h_{21}$ which are equal to other than zero must be of the same sign so that the expression K is positive. In a preferred embodiment, $h_{11}$ is negative so that temperature compensating elements may be incorporated to further stabilize other parameters of the circuit.

Another basic requirement in incorporating the active circuit of the invention in an active filter is that the R-C network to which the input terminals of the circuit are coupled have a resistive element in a series branch so that $h_{11}$ may be absorbed therein. Also, the R-C network shunting the output terminals of the active circuit should have a resistor capacitor parallel combination so that $h_{22}$ may be absorbed in the resistor such as $R_B$, and the output shunt capacitance of the active circuit may be absorbed in the capacitor such as $C_B$.

It will be appreciated that those familiar with the art may make modifications and equivalents of the present invention. These are to be considered as being within the scope and spirit of the invention. Therefore, all such modifications, equivalents and substitutions are deemed to fall within the scope of the claims appearing herein.

What is claimed is:

1. An active filter comprising two passive networks; and an active circuit connected in tandem therebetween, said active circuit including first and second transistors, each having a collector, a base and an emitter; a plurality of resistive means, a first of which for connecting the emitters of said transistors to a first reference potential, a second of which for connecting the collectors of said transistors to a second reference potential, and a third of which is an input resistive means interposed between one of said passive networks and the base of said first transistor, the resistor values of each of said resistive means being selected to insure that the input and output immittances of said active circuit have values which differ from zero; means for connecting the collector of said first transistor to the base of said second transistor; and feedback means for coupling the collector of said second transistor to the base of said first transistor through said input resistive means.

2. In an active filter network wherein an active circuit is combined with passive components to produce desired transmission characteristics an active circuit having nonzero input and output immittances, and the product of the reverse voltage amplification factor and the forward current gain is always positive comprising first and second transistors each having a collector, a base and an emitter, a plurality of means including resistors for connecting the emitters of said transistors to a first reference potential and the collectors to a second reference potential through said resistors and an input resistor coupled to the base of said second transistor, the resistor values of each of said resistors being selected to insure that the input and output immittances of said active circuit have values which differ from zero and that the product of the reverse voltage amplification factor and the forward current gain is always positive; means for connecting the collector of said first transistor to the base of said second transistor; and means for feeding back a signal at the collector of said second transistor to the base of said first transistor through said input resistor to control the input impedance of said active circuit to be equal to less than zero.

3. In an active filter network as recited in claim 2 wherein said active circuit includes temperature sensitive element coupled to said input resistor for stabilizing the input impedance of said active network over a selected temperature range.

4. In an active filter network as recited in claim 2 wherein said active circuit includes resistive means coupled between the base of said second transistor and said first reference potential; and resistive temperature sensitive means having negative resistance temperature coefficient coupled in parallel with the resistor interposed between the collector of said first transistor and said second reference level to stabilize the product of the $h_{12}$ and $h_{21}$ parameters of said active circuit over a selected temperature range.

5. A transistorized active circuit having a hybrid parameter input impedance $h_{11}$ which is less than zero and a hybrid parameter output admittance $h_{22}$ which is other than zero and a $h_{12}h_{21}$ that is positive comprising first and second transistors, each having a collector, a base and an emitter; resistive means for coupling the collectors of said transistors to a first reference potential and the emitters of said transistors to a second reference potential, and an input resistor coupled to the base of said first transistor, the resistor values of each of said resistive means being selected to insure that said active circuit has a hybrid parameter input impedance $h_{11}$ which is less than zero and a hybrid parameter output admittance $h_{22}$ which is other than zero and a $h_{12}h_{21}$ that is positive; means for connecting the collector of said first transistor to the base of said second transistor; and means for feeding back a signal from the collector of said second transistor through said input resistor to the base of said first transistor so as to control said input impedance and output admittance of said active circuit to be equal to less than zero and other than zero respectively.

6. A transistorized active network as recited in claim 5 further including a first resistance element having a negative resistance temperature coefficient coupled to said input resistive means for stabilizing the input impedance of said active network over a selected temperature range; and a second resistance element having a negative resistance temperature coefficient coupled across said resistive means interposed between said first reference potential and the collector of said first transistor for stabilizing the product of the reverse voltage amplification factor $h_{12}$ and the forward current gain $h_{21}$ over said selected temperature range.

7. In an active filter wherein an active circuit is connected in tandem between first and second passive networks, the first network connected across the input terminals of said active circuit and said second network being connected across the output terminals of said active circuit, said first passive network including an input resistor connected in series with one of the input terminals of said active circuit and said second passive network including an output resistor and an output capacitor connected in parallel across the output terminals of said active circuit, an arrangement comprising a pair of transistors; and passive elements coupled to said pair of transistors, the value of said passive elements being selected to insure that said active circuit has input and output immittances which are not equal to zero and a reverse voltage amplification factor and a forward current gain the product of which is always positive, whereby said input immittance is absorbable in said input resistor, and said output immittance is absorbable in said output resistor.

8. In an active filter as recited in claim 7 wherein said first and second passive networks include only resistive and capacitive elements and said passive elements coupled to said transistors include only resistive elements.

9. In an active filter as recited in claim 7 wherein said passive elements are coupled to said pair of transistors to form an active circuit definable by hybrid parameters $h_{11}$, $h_{12}$, $h_{21}$ and $h_{22}$, each parameter having a value other than zero and $h_{12}$ and $h_{21}$ having the same sign value.

10. In an active filter as recited in claim 7 wherein said first and second passive networks include only resistive and capacitive passive elements and said passive elements coupled to said transistors include resistive elements having negative resistive temperature coefficients, for stabilizing the operational characteristics of said active circuit over a selected temperature range.

11. In an active filter as recited in claim 10 wherein the input immittance of said active circuit is negative, said active circuit further including a resistive element having a negatve resistive temperature coefficient coupled in series with said first resistor of said first passive network for stabilizing the input immittance of said active circuit over a selected temperature range.

12. An active filter comprising a first passive network having input and output terminals, including a resistive element in series with one of said output terminals; a second passive network having an input and output terminal, including a resistive element and a capacitive element connected in parallel across said input terminals thereof; and an active circuit having input terminals coupled to the output terminals of said first passive network and output terminals coupled to the input terminals of said second passive network, said active circuit including active elements and passive elements coupled to said active elements, the values of said passive elements selected to insure that said active circuit has input and output immittances which are not equal to zero, said input and output immittances being absorbable in said resistive element included in said first passive network and in said resistive element connected in parallel across said input terminals of said second passive networks.

13. An active filter as recited in claim 12 wherein each of said first and second passive networks includes only resistive and capacitive elements, and in said active circuit and said active elements comprise a pair of transistors, and said passive elements include resistive temperature coefficients for stabilizing the input and output immittances of said active circuit over a selected temperature range.

14. An active filter comprising a first passive network having input and output terminals, including a resistive element in series with one of said output terminals; a second passive network having an input and output terminal, including a resistive element and a capacitive element connected in parallel across said input terminals thereof; and an active circuit having input terminals coupled to the output terminals of said first passive network and output terminals coupled to the input terminals of said second passive network, said active circuit including a pair of transistors and resistive elements including elements having negative resistive temperature coefficients, the values of said resistive elements being selected to insure that the input and output immittances of said active circuit are other than zero over a selected temperature range and that the reverse voltage amplification factor $h_{12}$ and the forward current gain $h_{21}$ of said active circuit have the same sign value.

15. An active filter as recited in claim 14 wherein the input immittance of said active circuit is less than zero.

16. An active filter comprising a first passive network having input and output terminals, including a resistive element in series with one of said output terminals; a second passive network having an input and output terminal, including a resistive element and a capacitive element connected in parallel across said input terminals thereof; and an active circuit having input terminals coupled to the output terminals of said first passive network and output terminals coupled to the input terminals of said second passive network, said active circuit including first and second transistors, each having a collector, a base, and an emitter; a plurality of resistive means, one for connecting the emitters of said first and second transistors to a first reference potential, a second for connecting the collectors of said transistors to a second reference potential, and a third input resistive means coupled between the base of said first transistor and the collector of said second transistor, the resistor values of each of said resistive means being selected so that the input and output immittances across said input and output terminals are other than zero and the product of the reverse voltage amplification factor and the forward current gain of said active circuit is always greater than zero; means for connecting the collector of said first transistor to the base of said second transistor; means for coupling the input terminals of said active circuit to the junction point between said input resistive means and the collector of said second transistor and to said first reference potential; and means for coupling the output terminals of said active circuit to the emitter of said second transistor and said first reference potential.

17. An active filter as recited in claim 16 wherein said active circuit further includes resistive elements having negative resistive temperature coefficients coupled to at least the resistive element coupling the collector and emitter of said first transistor to said second and first potential references respectively for minimizing the effect of temperature changes within a selected range on the input and output immittances of said circuit, the reverse voltage amplification factor and the forward current gain thereof.

18. An active filter as recited in claim 16 wherein the input impedance of said active circuit is less than zero.

19. An active filter as recited in claim 18 wherein said active circuit includes at least one resistive element having negative resistive temperature coefficient coupled between the input terminal of said active circuit and said input resistive element for minimizing the effect of temperature variations within a selected range on the input impedance of said active network.

References Cited

UNITED STATES PATENTS

| | | | |
|---|---|---|---|
| 2,864,062 | 12/1958 | Schaffner | 333—80 |
| 3,264,571 | 8/1966 | Meindl et al. | 330—23 |

FOREIGN PATENTS

| | | |
|---|---|---|
| 1,174,118 | 3/1959 | France. |

OTHER REFERENCES

Collins: Temperature Sensitive Devices, Electronics World, October 1964, pp. 50–52.

Linvill: RC Active Filters, Proceedings of the IRE, March 1954, pp. 555–564.

ROY LAKE, *Primary Examiner.*

L. J. DAHL, *Assistant Examiner.*